US011308973B2

(12) United States Patent
Baek et al.

(10) Patent No.: US 11,308,973 B2
(45) Date of Patent: Apr. 19, 2022

(54) METHOD FOR PROCESSING MULTI-CHANNEL AUDIO SIGNAL ON BASIS OF NEURAL NETWORK AND ELECTRONIC DEVICE

(71) Applicant: Samsung Electronics Co., Ltd., Gyeonggi-do (KR)

(72) Inventors: Soonho Baek, Gyeonggi-do (KR); Kiho Cho, Gyeonggi-do (KR); Jongmo Keum, Gyeonggi-do (KR); Beakkwon Son, Gyeonggi-do (KR); Myoungho Lee, Gyeonggi-do (KR); Yonghoon Lee, Gyeonggi-do (KR); Hangil Moon, Gyeonggi-do (KR); Jaemo Yang, Gyeonggi-do (KR); Gunwoo Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

(21) Appl. No.: 16/987,475

(22) Filed: Aug. 7, 2020

(65) Prior Publication Data
US 2021/0043220 A1    Feb. 11, 2021

(30) Foreign Application Priority Data
Aug. 7, 2019  (KR) .................. 10-2019-0096223

(51) Int. Cl.
*G10L 21/0232* (2013.01)
*H04R 1/40* (2006.01)
(Continued)

(52) U.S. Cl.
CPC ............ *G10L 21/0232* (2013.01); *G06N 3/04* (2013.01); *G06N 3/08* (2013.01); *G10L 21/0364* (2013.01);
(Continued)

(58) Field of Classification Search
None
See application file for complete search history.

(56) References Cited

U.S. PATENT DOCUMENTS 10,347,256 B2    7/2019  Khoury et al.
2016/0093313 A1  3/2016  Vickers
(Continued)

FOREIGN PATENT DOCUMENTS

EP          0831458 A2      3/1998
JP          2013-167805 A   8/2013
KR          10-2017-0129477 A  11/2017

OTHER PUBLICATIONS

International Search Report dated Nov. 16, 2020.

*Primary Examiner* — Paul W Huber
(74) *Attorney, Agent, or Firm* — Cha & Reiter, LLC.

(57) ABSTRACT

According to an embodiment, an electronic device may include a memory configured to store a noise removal neural network model and data utilized in the noise removal neural network model and a processor electrically connected to the memory wherein the memory may store instructions that, when executed, enable the processor to: output a first channel signal using a first beamformer for a multi-channel audio signal; output a second channel signal using a second beamformer; generate a third channel signal that compensates for a difference in noise levels between the first channel signal and the second channel signal; and train the noise removal neural network model by using the third channel signal in which the difference in noise levels is compensated for and the first channel signal as input values.

20 Claims, 12 Drawing Sheets

(51) Int. Cl.
*H04R 3/00* (2006.01)
*H04R 29/00* (2006.01)
*G10L 25/51* (2013.01)
*G10L 25/30* (2013.01)
*H04S 3/00* (2006.01)
*G06N 3/04* (2006.01)
*G06N 3/08* (2006.01)
*G10L 21/0364* (2013.01)
*G10L 21/0216* (2013.01)

(52) U.S. Cl.
CPC .............. *G10L 25/30* (2013.01); *G10L 25/51* (2013.01); *H04R 1/406* (2013.01); *H04R 3/005* (2013.01); *H04R 29/005* (2013.01); *H04S 3/008* (2013.01); *G10L 2021/02166* (2013.01); *H04S 2400/01* (2013.01); *H04S 2400/15* (2013.01)

(56) References Cited

U.S. PATENT DOCUMENTS

| | | |
|---|---|---|
| 2016/0284346 A1 | 9/2016 | Visser et al. |
| 2017/0092268 A1 | 3/2017 | Kristjansson |
| 2017/0365255 A1 | 12/2017 | Kupryjanow et al. |
| 2018/0040333 A1 | 2/2018 | Wung et al. |
| 2018/0068675 A1* | 3/2018 | Variani ................. G10L 19/008 |
| 2018/0286425 A1 | 10/2018 | Baek et al. |
| 2019/0318755 A1* | 10/2019 | Tash ........................ G10L 25/84 |

\* cited by examiner

METHOD FOR PROCESSING MULTI-CHANNEL AUDIO SIGNAL ON BASIS OF NEURAL NETWORK AND ELECTRONIC DEVICE

CROSS-REFERENCE TO RELATED APPLICATION(S)

This application is based on and claims priority under 35 U.S.C. 119 to Korean Patent Application No. 10-2019-0096223, filed on Aug. 7, 2019, in the Korean Intellectual Property Office, the disclosure of which is herein incorporated by reference in its entirety.

BACKGROUND

1) Field

Certain embodiments of the instant disclosure generally relate to a method for processing a multi-channel audio signal on the basis of a neural network and an electronic device for performing the same.

2) Description of Related Art

Conventionally, electronic devices may be controlled by voice input signals inputted by the user. Since the voice input signal input into a microphone is distorted by noise or reverberation, it is possible to improve sound quality by removing background noise and reverberation from the voice input signal. In the field of voice recognition or voice communication, various noise removal techniques for removing noise or reverberation have been proposed. For example, neural networks (e.g., deep neural networks) are being introduced in the field of voice enhancement and voice recognition, and research has been conducted to remove noise through deep neural networks.

The above information is presented as background information only to assist with an understanding of the disclosure. No determination has been made, and no assertion is made, as to whether any of the above might be applicable as prior art with regard to the disclosure.

SUMMARY

More specifically, in the case of a voice signal input through multi-channel microphones, the output waveform may be changed according to the spatial characteristics of the voice signal (e.g., location and directionality of where the voice originated). Accordingly, a method for removing noise of a voice signal has been developed by applying the multi-channel voice input signal to a neural network technology. In the case of a multi-channel voice input environment, a feature value can be extracted by reflecting the spatial characteristics of the signal, and the extracted feature value can be used as an input signal of a neural network. The feature value may be determined according to the direction of the voice and noise signals or the microphone implementation environment. The neural network model trains from a large amount of training data and outputs the result value. In an environment having spatial characteristics that are not considered for training, performance degradation in which voice distortion or residual noise increases may occur. In addition, when removing noise using the neural network model, difference in the noise removal amount may occur depending on the presence or absence of a voice. Due to the difference in the noise removal amount, it may be difficult to remove residual noise through a post-processing technique.

According to an embodiment, an electronic device may include a memory configured to store a noise removal neural network model and data utilized in the noise removal neural network model and a processor electrically connected to the memory wherein the memory may store instructions that, when executed, enable the processor to: output a first channel signal using a first beamformer for a multi-channel audio signal; output a second channel signal using a second beamformer; generate a third channel signal that compensates for a difference in noise levels between the first channel signal and the second channel signal; and train the noise removal neural network model by using the third channel signal in which the difference in noise levels is compensated for and the first channel signal as input values.

According to an embodiment, an electronic device comprising a communication circuit; a memory configured to store a noise removal neural network model and data utilized in the noise removal neural network model; and a processor configured to be electrically connected to the memory, wherein the memory stores instructions that, when executed, enable the processor to: receive a first channel user voice signal and a second channel user voice signal from an external electronic device through the communication circuit; generate a third channel user voice signal in which a difference in noise levels between the first channel user voice signal and the second channel user voice signal is compensated; and train the noise removal neural network model using the third channel user voice signal in which the difference in noise levels is compensated and the first channel user voice signal as input values to optimize the noise removal neural network model for user voice.

Additional aspects will be set forth in part in the description which follows and, in part, will be apparent from the description, or may be learned by practice of the presented embodiments.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

According to certain embodiments, an electronic device capable of improving noise removal using a signal processing algorithm is provided. The removal of the noise of a multi-channel audio signal may be based on a neural network.

The electronic device according to certain embodiments can reduce variations in noise removal performance by training the noise removal neural network model using input signals that compensate for the noise level difference between multi-channel signals input to the neural network.

The electronic device according to certain embodiments can reduce the noise removal performance difference according to the presence or absence of a voice by adding input signal compensation and output signal compensation algorithms of the neural network model, and improve noise removal performance by uniformizing voice distortion compensation and noise cancellation.

Figure 1:
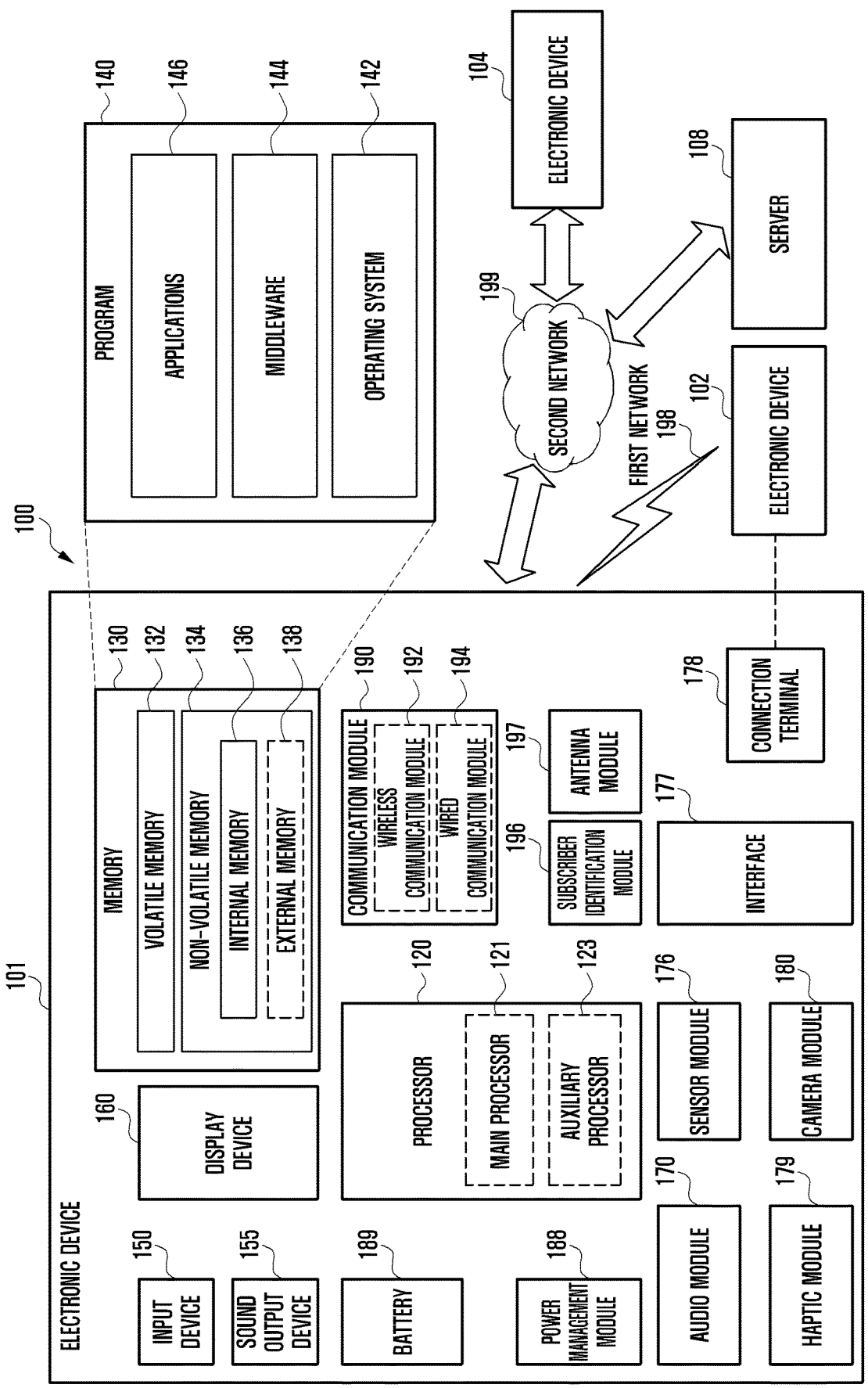
FIG. 1 is a block diagram illustrating an electronic device 101 in a network environment according to an embodiment.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
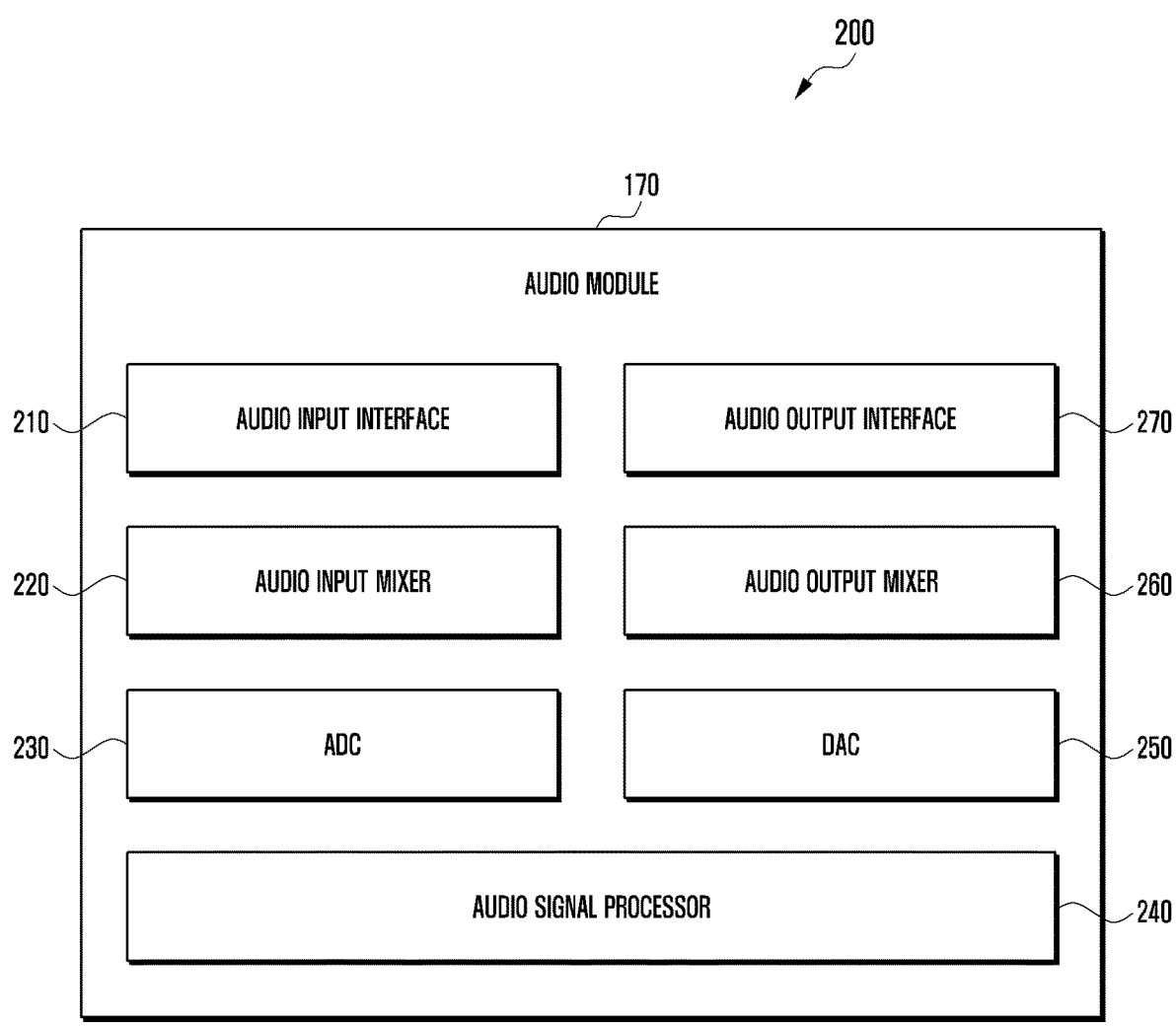
FIG. 2 is a block diagram illustrating the audio module according to an embodiment.

FIG. 2 is a block diagram 200 illustrating the audio module 170 according to an embodiment. Referring to FIG. 2, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input device 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of inputted audio signals into at least one audio signal. For example, according to an embodiment, the audio input mixer 220 may synthesize a plurality of analog audio signals inputted via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor (120) or the memory (130)) of the electronic device 101 into an analog audio signal.

The audio output mixer 260 may synthesize a plurality of audio signals, which are to be outputted, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output device 155. The sound output device 155 may include, for example, a speaker, such as a dynamic driver or a balanced armature driver, or a receiver. According to an embodiment, the sound output device 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal inputted via the audio input interface 210 or an audio signal that is to be outputted via the audio output interface 270. According to an embodiment, the audio amplifier may be configured as a module separate from the audio module 170.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 3:
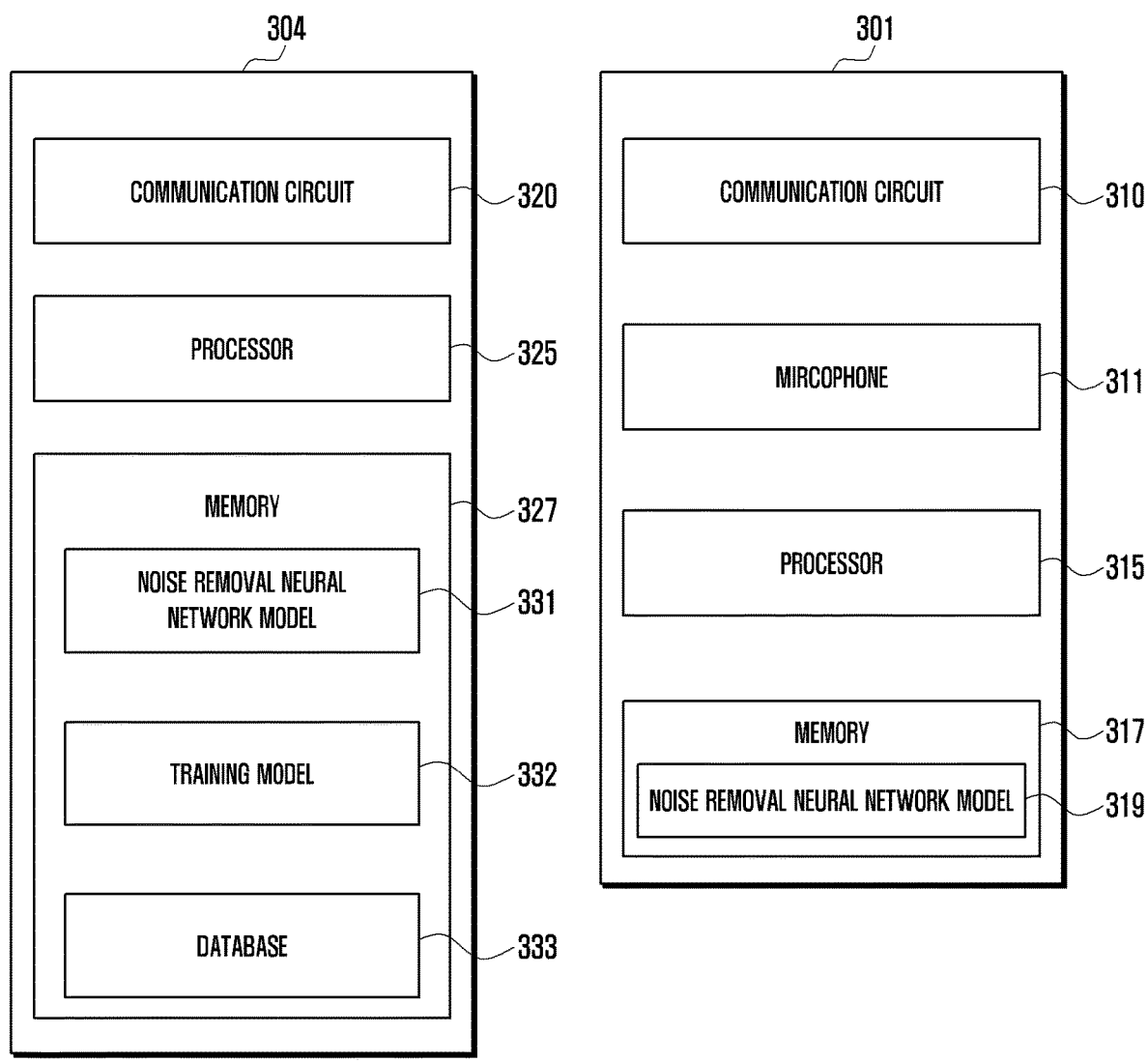
FIG. 3 illustrates a configuration of a first electronic device and a second electronic device according to an embodiment.

FIG. 3 illustrates a configuration of a first electronic device and a second electronic device according to an embodiment.

Referring to FIG. 3, according to an embodiment, the first electronic device 304 and the second electronic device 301 may process voice signals using a noise removal neural network model. For example, the first electronic device 304 may be a voice signal processing server, a noise removal processing server, or a neural network model training and updating device. The second electronic device 301 may be a smart phone, a mobile electronic device, a portable electronic device, a voice recognition device, or a neural network model storage device. The second electronic device 301 may include the configuration of the electronic device 101 of FIG. 1, but the first electronic device 304 may also include parts of the configuration of the electronic device 101 of FIG. 1.

According to an embodiment, the first electronic device 304 may include a communication circuit 320, a processor 325 and/or a memory 327. The communication circuit 320 of the first electronic device 304 may communicate with a communication circuit 310 of the second electronic device 301. The communication circuit 320 of the first electronic device 304 may transmit the noise removal neural network model 331 to the second electronic device 301 or process the voice signal transmitted from the second electronic device 301 and then transmit the processing result to the second electronic device 301. As another example, the second electronic device 301 may store data related to the noise removal neural network model 331 in the memory 317.

According to an embodiment, the processor 325 of the first electronic device 304 may build a noise removal neural network (e.g., deep neural network (DNN)) model 331 trained to improve the signal to noise ratio (SNR) of the voice in the input voice signal by modeling a nonlinear relationship between a signal in which a voice signal is emphasized and a signal in which the voice signal is attenuated. The processor 325 may train the noise removal neural network model 331 using the training model 332 and update the noise removal neural network model 331.

According to an embodiment, the processor 325 of the first electronic device 304 may generate a multi-channel voice input signal on the basis of database 333. The processor 325 may acquire N (e.g., 2) channel signals by performing beamforming N (e.g., an integer greater than or equal to 2) times on the basis of the multi-channel voice input. The processor 325 of the first electronic device 304 may compensate for the noise level difference between N (e.g., 2) channels, and use the compensated N (e.g., 2) channel signals as the input value to the noise removal neural network model to output a voice signal from which noise is removed and a signal with an improved signal-to-noise-ratio (SNR) of the voice compared to the noise signal. For example, the processor 325 may perform a first beamforming and a second beamforming on the voice input signal to form a first channel signal with an emphasized voice signal and a second channel signal with an attenuated voice signal, and after compensating for the noise level difference of channels between the first channel signal and the second channel signal, may use the same as the input value to the noise removal neural network model. For example, the second channel signal in which the noise level difference is compensated for may be referred to as a third channel signal.

According to an embodiment, the memory 327 of the first electronic device 304 may include a noise removal neural network model 331, a training model 332, and a database 333. According to an embodiment, the noise removal neural network model 331 is an artificial neural network composed of a plurality of hidden layers between an input layer and an output layer, and can model complex nonlinear relationships. The noise removal neural network model 331 may output a signal in which the SNR of a voice is improved or a signal from which noise is removed, using a noise removal gain coefficient derived via a training model on the basis of a feature vector of the voice input.

According to an embodiment, the noise removal neural network model 331 may include a neural network model based on at least one of a convolutional neural network (CNN), a recurrent neural network (RNN), or a deep neural network (DNN). According to an embodiment, the training model 332 may be a model implemented to train the noise removal neural network model 331. The training model 332 may estimate an optimal gain via regression training by using input features corresponding to at least two or more channels as an input vector, and minimize noise removal differences by using a target feature vector as an objective function of the neural network. As a result, training of the neural network can be implemented. The processor 325 may update the noise removal neural network model 331 on the basis of the training result of the training model 332. According to an embodiment, the processor 325 may transmit the updated noise removal neural network model 331 or update-related data to the second electronic device 301.

According to an embodiment, the database 333 may store data for implementing the noise removal neural network model 331 and the training model 332. For example, the database 333 may include a voice signal database, a two-channel impulse response (IR) database, and noise signal data.

The second electronic device 301 according to an embodiment may include a communication circuit 310, a microphone 311, a processor 315, and/or memory 317. The processors 315 and 325 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The communication circuit 310 of the second electronic device 301 may communicate with the first electronic device 304. For example, the communication circuit 310 may receive the noise removal neural network model 331 or an updated noise removal neural network model 331 from the first electronic device 304. As another example, the communication circuit 310 may receive update information for a noise removal neural network model 319 stored in the memory 317. The second electronic device 301 may store the noise removal neural network model received from the first electronic device 304 in the memory 317.

The second electronic device 301 may acquire an audio signal through the microphone 311. The second electronic device 301 may include a plurality of microphones, and may acquire an audio signal in multi-channels through each microphone.

The memory 317 of the second electronic device 301 may store the noise removal neural network model 319. According to an embodiment, the noise removal neural network model 319 stored in the memory 317 of the second electronic device 301 may be the same model as a noise removal neural network model 331 stored in the memory 327 of the first electronic device 304 or may be a different model.

According to an embodiment, the processor 315 of the second electronic device 301 may output a voice signal in which the SNR of the voice is improved or a noise-removed voice signal for a voice input using a noise removal neural network model. The processor 315 may perform beamforming N times on the basis of the audio signal acquired through the microphone 311 and use the N channel signals as input values of a noise removal neural network model. For example, the processor 315 may acquire two audio signals from two microphones.

According to an embodiment, the processor 315 of the second electronic device 301 may acquire N channel signals by performing N beamforming on the basis of the multi-channel audio signal. For example, the processor 315 may perform first beamforming and second beamforming on a multi-channel audio signal to form a first channel signal with an emphasizing voice signal and a second channel signal with an attenuation of the voice signal, and compensate for a difference in noise level of the channels between the first channel signal and the second channel signal. For example, the second channel signal in which the noise level difference is compensated for may be referred to as a third channel signal. The processor 315 may use the first channel signal and the third channel signal as input values of the noise removal neural network model to output a signal in which the signal-to-noise-ratio (SNR) of the noise signal is improved compared to the noise and a signal in which the noise is removed. Hereinafter, a voice signal from which noise has been removed or a signal with improved SNR of a voice compared to a noise signal may be understood as a neural network output signal.

According to an embodiment, the processor 315 of the second electronic device 301 may compensate for voice distortion difference by comparing the neural network output signal with the first channel signal used as the input value of the noise removal neural network model. For example, the processor 315 may estimate the average value of the noise removal amount in the sound section of the voice signal on the basis of the neural network output signal, and reduce the noise removal amount in the silent section of the voice signal by the noise removal amount in the sound section so that the noise removal amount in total in the voice signal is uniform.

Figure 4:
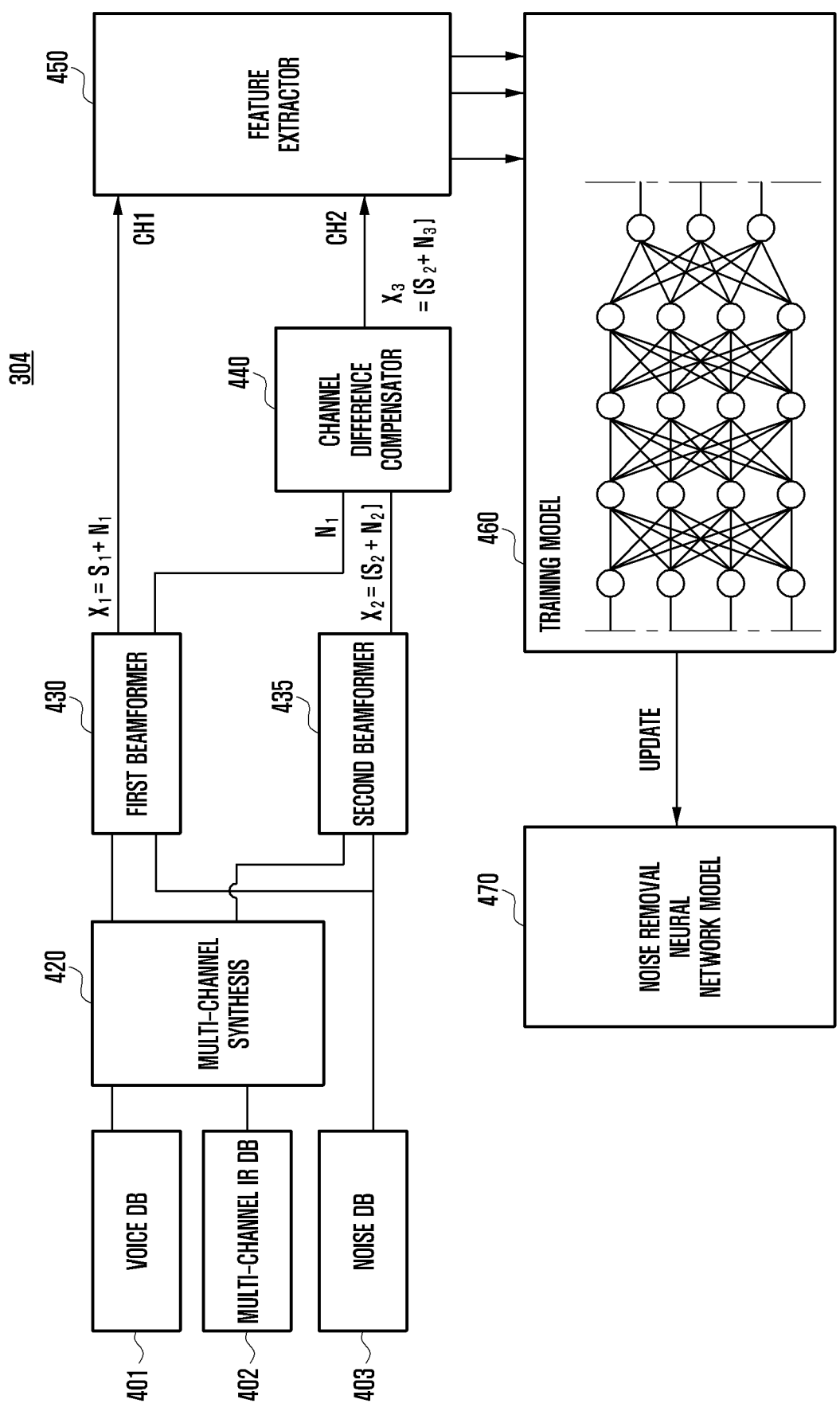
FIG. 4 is a block diagram of a first electronic device according to an embodiment.

FIG. 4 is a block diagram of a first electronic device according to an embodiment. The block illustrated in FIG. 4 represents a program module and the program module may be stored in the memory 327 of the first electronic device 304 illustrated in FIG. 3 and may be executed by the processor 325. The block diagram of FIG. 4 is divided into blocks for convenience of description, but program modules of the disclosed embodiments are not limited to the particular implementation shown. The first electronic device 304 illustrated in FIG. 4 may be an electronic device (e.g., a server) that builds a neural network model and trains to update the neural network model.

Referring to FIG. 4, according to an embodiment, the processor 325 of the first electronic device 304 illustrated in FIG. 3 may use a program module to train a noise removal neural network model and update the noise removal neural network model. The database 333 illustrated in FIG. 3 may include a voice database 401, a multi-channel impulse response (IR) database 402 and/or a multi-channel noise database 403 of FIG. 4.

According to an embodiment, the voice database 401 may include noise-free voice information acquired in a mono channel. The multi-channel IR database 402 may store spatial information and correlation (e.g., calculated values) between the voice start point and the microphone. The multi-channel noise database 403 may include noise information acquired through multi-channels (e.g., two microphones) or multi-channel noise information estimated from a single channel. For example, the multi-channel noise information may include first noise and second noise. The first noise may be a noise signal measured at a first position or a noise signal acquired by a first microphone, and the second noise may be a signal measured at a second position or a noise signal acquired by a second microphone.

According to an embodiment, a multi-channel synthesizer 420 may generate a multi-channel voice signal reflecting spatial IR characteristics by using voice information stored in the voice database 401 and IR calculation values stored in the multi-channel IR database 402. For example, the multi-channel voice signal may include a first voice and a second voice. The first voice may be a signal measured at a first location or a voice signal acquired by a first microphone, and the second voice may be a signal measured at a second location or a voice signal acquired by a second microphone.

According to another embodiment, the first electronic device 304 may estimate the multi-channel noise signal or the multi-channel voice signal by using the voice signal or noise signal recorded in the second electronic device 301 having two microphones, and implement the voice database 401 and the multi-channel noise database 402 using the recorded signals.

According to an embodiment, the first beamformer 430 may perform beamforming on the multi-channel voice signal received from the multi-channel synthesizer 420 and the multi-channel noise signal received from the multi-channel noise database 403 to output a first channel signal $X_1=S_1+N_1$. For example, a first beamformer 430 may be a speaker steering beamformer. The first beamformer 430 may emphasize the speaker's voice level and output a first channel signal with noise attenuation $X_1=S_1+N_1$ by using a difference in arrival times of N voices and a noise removal rate. According to an embodiment, the first channel signal may be estimated to include the first voice signal $S_1$ and the first noise signal $N_1$. For example, the first channel signal $X_1=S_1+N_1$ may be a signal having a large signal-to-noise ratio (SNR) compared to the second channel signal $X_2=S_2+N_2$.

According to an embodiment, a second beamformer 435 may perform beamforming on the multi-channel voice signal received from the multi-channel synthesizer 420 and the multi-channel noise signal received from the multi-channel noise database 403, thereby outputting a second channel signal $X_2=S_2+N_2$. For example, the second beamformer 435 may be a null steering beamformer. The second beamformer 435 may output a second channel signal $X_2=S_2+N_2$ in which the speaker's voice is attenuated by using the difference in arrival times of N voices and a noise attenuation rate. The second channel signal $X_2=S_2+N_2$ may be estimated to include the second audio signal $S_2$ and the second noise signal $N_2$. For example, the second channel signal $X_2=S_2+N_2$ may be a signal having a small signal-to-noise-ratio (SNR) compared to the first channel signal $X_1=S_1+N_1$. As such, the level of the second voice signal $S_2$ may be smaller than the level of the first voice signal $S_1$.

According to an embodiment, a channel difference compensator 440 may calculate a noise level difference between channels on the basis of the first noise signal $N_1$ and the second noise signal $N_2$. The channel difference compensator 440 may estimate the compensation value d on the basis of the noise level difference between channels, and convert the second channel signal into a third channel signal $X_3=S_3+N_3$ in which the compensation value d is applied to the second channel signal $X_2=S_2+N_2$. For example, the noise signal $N_3$ of the third channel signal $X_3$ may be a signal in which the noise signal $N_2$ of the second channel signal $X_2$ is compensated by a compensation value d. The third voice signal $S_3$ may be substantially the same as, for example, the second voice signal $S_2$.

According to an embodiment, the channel difference compensator 440 may identify a silent section (e.g., a frequency region without voice) in the first channel signal $X_1$ and the second channel signal $X_2$ and calculate a noise level difference between channels in the silent section. The channel difference compensator 440 may estimate the average value of the noise level difference and apply a compensation value corresponding to the average value.

According to an embodiment, a feature extractor 450 may extract a feature vector on the basis of the first channel signal $X_1$ obtained from the first beamformer 430 and the third channel signal $X_3$ on which the compensation value is reflected from the channel difference compensator 440. The feature extractor 450 may transmit the extracted feature vector to a neural network model or a training model. The feature vector, for example, may include at least one of a target feature value and a neural network input feature value for training the noise removal neural network model 470.

For example, the feature extractor 450 may extract a normalized feature vector (e.g., normalized log-spectral magnitude, normalized mel frequency cepstral coefficients (MFCC), normalized linear prediction coefficient (LPC), or normalized linear prediction (LP) residual) using the frequency signal converted to short time Fourier transform (STFT).

According to an embodiment, the feature extractor 450 may synthesize the first channel signal $X_1$ and the third channel signal $X_3$, and extract an input feature value from the synthesized signal. The input feature value may include, for example, a value input to the voice main channel and a value input to the noise reference channel.

For example, a value input to the voice main channel may include a value obtained by multiplying the first noise signal $N_1$ by a first variable (e.g., $g_i$) and the first voice signal $S_1$ (e.g., $S_1+g_i*N_1=CH1$). The value input to the noise reference channel may include the value obtained by multiplying the compensated second noise signal ($N_3$) by the first variable (e.g., $g_i$) and the second voice signal $S_1$ (e.g., $S_2+g_i*N_3=CH2$)). For example, $g_i$ may be a variable for determining the SNR of a voice signal containing noise. The $g_i$ applied to the training model 460 may use an SNR signal in a range of approximately −10 dB to 30 dB, but is not limited thereto.

According to an embodiment, the feature extractor 450 may extract a signal having an improved SNR as a target feature value. For example, the target feature value may include a value obtained by multiplying the compensated second noise signal $N_3$ by a second variable (e.g., $g_o$) and the first voice signal $S_1$ (e.g., $S_1+g_o*N_3$=target). For example, $g_o$ is configured as a value smaller than $g_i$ and may be changed according to the signal-to-noise ratio (SNR) of the target.

According to an embodiment, the training model 460 may be a model implemented to train the noise removal neural network model 470. The training model 460 may use feature vectors input through two channels (e.g., values input through the main channel and values input through the noise reference channel) as input values, estimate the continuous optimal gain via regression training, and perform the training of the neural network in the direction to minimize the difference in noise removal gain by using a target feature vector (e.g., a target feature value, label) as a function of the neural network. The training model 460 may update the noise removal neural network model 470 on the basis of the training result.

For example, the training model 460 aims to find at least one of a noise removal rule, a noise removal function, or a noise removal gain factor for deriving an output characteristic from an input characteristic by training data consisting of input and output pairs, and may be trained to output a voice signal from which noise is removed from the voice signal and the noise signal, or a signal in which the SNR of the voice is improved compared to the noise signal.

The noise removal neural network model 470 may output a signal in which the noise is canceled or a signal in which the SNR of a voice is improved compared to a noise signal (e.g., a neural network output signal) using a noise removal gain coefficient implemented via a training model for voice input.

Figure 5A:
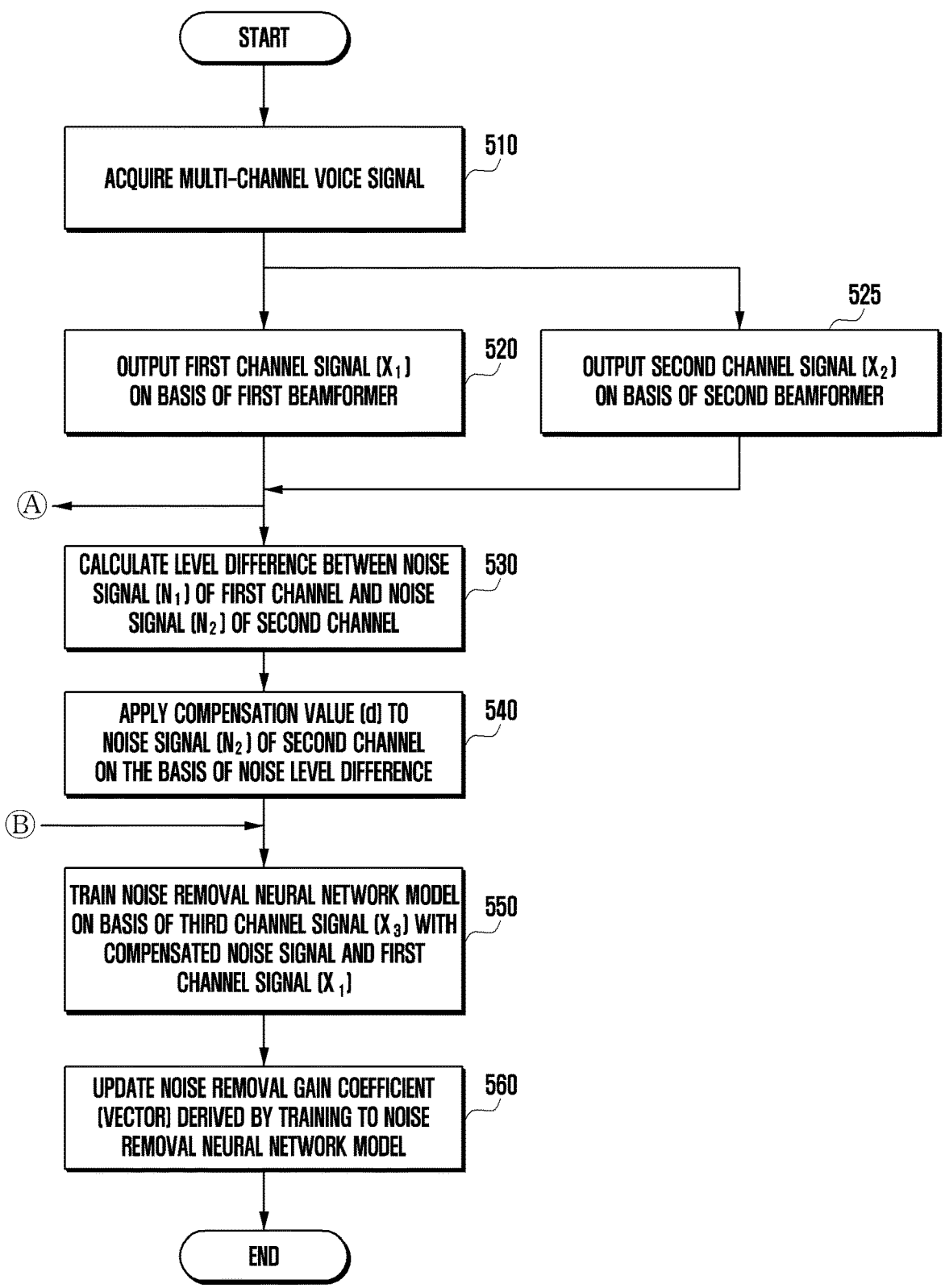
FIG. 5A is a flowchart illustrating a method for training a noise removal neural network model in a first electronic device according to an embodiment.
Figure 5B:
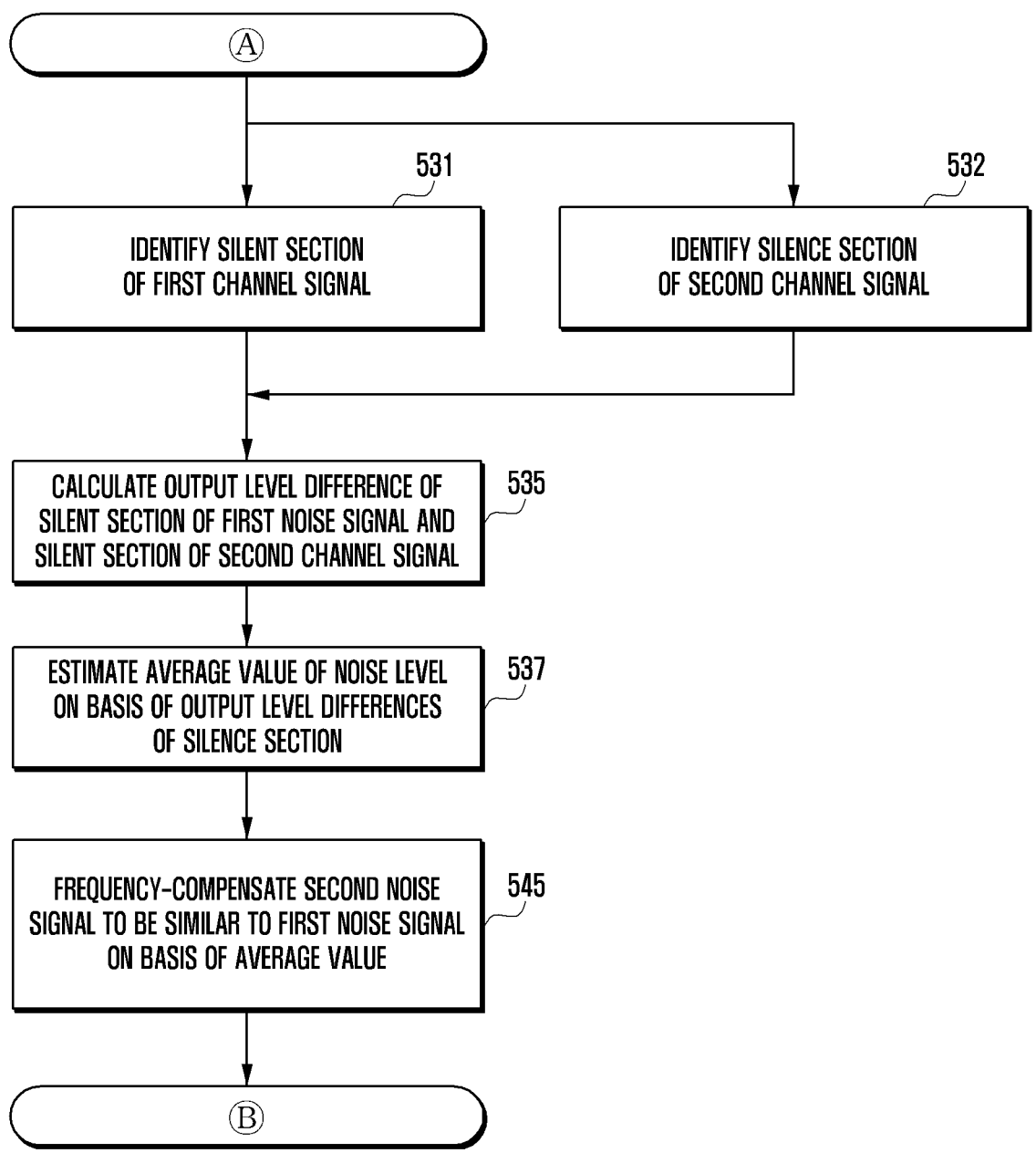
FIG. 5B is another flowchart illustrating a method for training a noise removal neural network model in a first electronic device according to an embodiment.

FIGS. 5A-5B illustrate a method for training a noise removal neural network model in a first electronic device according to an embodiment. FIGS. 5A-5B are flowcharts of the first electronic device 304 illustrated in FIG. 3.

Referring to FIG. 5A and FIG. 5B, according to an embodiment, the processor 325 of the first electronic device 304 illustrated in FIG. 3 may acquire a multi-channel voice signal in operation 510. For example, the processor 325 may acquire at least two voice signals reflecting spatial information differences via the database.

In operation 520, the processor 325 may output a first channel signal on the basis of the first beamformer for the multi-channel voice signal. The first channel signal may be a first channel signal $X_1=S_1+N_1$ in which a speaker's voice level is emphasized and noise is attenuated using differences in arrival time and noise removal rates of at least two voices.

In operation 525, the processor 325 may output a second channel signal on the basis of the second beamformer for the voice signal of the N channels. The second channel signal may be a second channel signal $X_2=S_2+N_2$ in which a speaker's voice level is attenuated using differences in arrival time and noise removal rates of at least two voices. As an example, operation 520 and operation 525 may be performed sequentially. In another example, they may be performed in parallel.

According to an embodiment, the first channel signal and the second channel signal may include, as a voice signal $S_1$, a signal having the largest voice power recorded so that the voice power between the microphones is different in an electronic device having two or more microphones, and may include a signal having the smallest voice power as a voice signal $S_2$. The noise signal $N_1$ and the noise signal $N_2$ may also be included as signals directly recorded by two or more microphones.

In operation 530, the processor 325 may calculate a level difference between the noise signal $N_1$ of the first channel signal and the noise signal $N_2$ of the second channel signal. For example, the processor 325 may determine the level of the first noise signal from the first channel signal by identifying the silent section, and estimate the level of the second noise signal from the second channel signal using the level of the first noise signal in the first channel signal.

In operation 540, the processor 325 may estimate the compensation value on the basis of the level difference between the first noise signal $N_1$ and the second noise signal $N_2$ and apply the compensation value d to the second noise signal $N_2$. The compensation value may refer to a value for frequency compensation or amplitude change. For example, the second channel signal $X_2$ to which the compensation value is applied may be referred to a third channel signal $X_3=S_3+N_3$. Depending on the compensation value, the third voice signal $S_3$ may be substantially the same as the second audio signal $S_2$. In operation 550, the processor 325 may train the noise removal neural network model on the basis of the third channel signal $X_3$ for which the noise signal is compensated and the first channel signal $X_1$. For example, the processor may extract a feature vector on the basis of the third channel signal $X_3$, where the noise signal is compensated for, and the first channel signal $X_1$, and input the feature vector into the training model to train the noise removal neural network model. The feature vector may include, for example, an input feature value (e.g., a value input to the main channel and a value input to the noise reference channel), or a target feature value. In operation 560, the processor 325 may train the noise removal neural network model and update the derived gain coefficient to the noise removal neural network model. According to an embodiment, the processor 325 of the electronic device 304 may estimate an average value of noise level differences between two channels in a silent section in addition to the operations of FIG. 5, and compensate the second channel signal on the basis of the average value.

According to another embodiment, the processor 325 may perform operations 520 and 525 of FIG. 5 and may proceed to operation A. In operation 531, the processor 325 may identify the silent section of the first channel signal $X_1$. In operation 532, the processor 325 may identify the silent section of the second channel signal $X_2$. For example, operations 531 and 532 may be performed sequentially. In another example, they may be performed in parallel. According to an embodiment, the processor 325 may receive frequency information for the silent section and the sound section from the post-processing unit (not shown) in relation to the first channel signal $X_1$ and the second channel signal $X_2$ and identify the silent section on the basis of the same.

In operation 535, the processor 325 may estimate the difference in output levels between the first channel signal $X_1$ in the silent section and the second channel signal $X_2$ in the silent section. For example, since the silent section means a section without the user inputted voice, the difference in output levels between the silent sections can be understood as the difference in noise signal level.

In operation 537, the processor 325 may estimate the average value on the basis of the differences in output levels of the silent sections.

In operation 545, the processor 325 may perform frequency-compensation for the noise signal of the second channel signal $X_2$ to be similar to the noise level of the first channel signal $X_1$ on the basis of the average value. For example, the processor 325 may compensate the frequency by adjusting the frequency and amplitude to a predetermined ratio corresponding to the average value. The processor 325 may proceed to operation B, which is the start of operation 550, to train the noise removal neural network model based on the third channel signal $X_3$ in which the noise signal is compensated for and the first channel signal $X_1$.

According to an embodiment, an electronic device (e.g., the electronic device 304 of FIG. 3) may include a memory configured to store a noise removal neural network model (e.g., the noise removal neural network model 331 of FIG. 3) and data utilized in the noise removal neural network model (e.g., the memory 327 of FIG. 3), and a processor electrically connected to the memory (e.g., the processor 325 of FIG. 3), wherein the memory may store instructions that, when executed, enable the processor to: output a first channel signal using a first beamformer for a multi-channel audio signal; output a second channel signal using a second beamformer; generate a third channel signal that compensates for a difference in noise levels between the first channel signal and the second channel signal; and train the noise removal neural network model by using the third channel signal in which the difference in noise levels is compensated for and the first channel signal as input values.

According to an embodiment, the memory 327 may store instructions that, when executed, enable the processor 325 to: receive the multi-channel voice signal to build the noise removal neural network model that outputs a noise-removed voice signal or a signal with an improved signal-to-noise-ratio (SNR) compared to the noise signal; and update at least one of a noise removal rule, a noise removal function, and a noise removal gain coefficient of the noise removal neural network model by training the noise removal neural network model.

The electronic device 304 according to an embodiment may further include a communication circuit (e.g., the communication circuit 320 of FIG. 3), and the memory 327 may store instructions that, when executed, enable the processor 325 to transmit the noise removal neural network model, the updated noise removal neural network model, and the update information of the noise removal neural network model to an external electronic device through the communication circuit.

According to an embodiment, the first channel signal may include a signal in which a speaker's voice level is emphasized and noise is attenuated using a difference in arrival times of the multi-channel voice signal and a noise removal rate, and the second channel signal may include a signal in which the speaker's voice level is attenuated.

According to an embodiment, the memory 327 may further store instructions that, when executed, enable the processor 325 to: identify the sound section and the silent section from the first channel signal and the second channel signal; and compare a difference in output levels between the silent section of the first channel signal and the silent section of the second channel signal to calculate the difference in noise levels.

According to an embodiment, the memory 327 may store instructions that, when executed, enable the processor 325 to: estimate an average value of an output level difference between the silent section of the first channel signal and the silent section of the second channel signal; and frequency-compensate a noise signal of the second channel signal by a compensation value corresponding to the average value to generate a third channel signal.

According to an embodiment, the memory 327 may store instructions that, when executed, enable the processor 325 to: extract a feature vector based on the third channel signal and the first channel signal; and input the feature vector as an input value for training the noise removal neural network model, wherein the feature vector may include a first feature value input to a voice main channel, a second feature value input to a noise reference channel, and a third feature value in which a signal-to-noise ratio (SNR) is improved from the first feature value.

According to an embodiment, the memory 327 may store instructions that, when executed, enable the processor 325 to: designate the first feature value and the second feature value as input variables; designate the third feature value as an output variable; and train the noise removal neural network model to derive at least one of a noise removal rule, a noise removal function, and noise removal gain coefficients based on training data.

Figure 6:
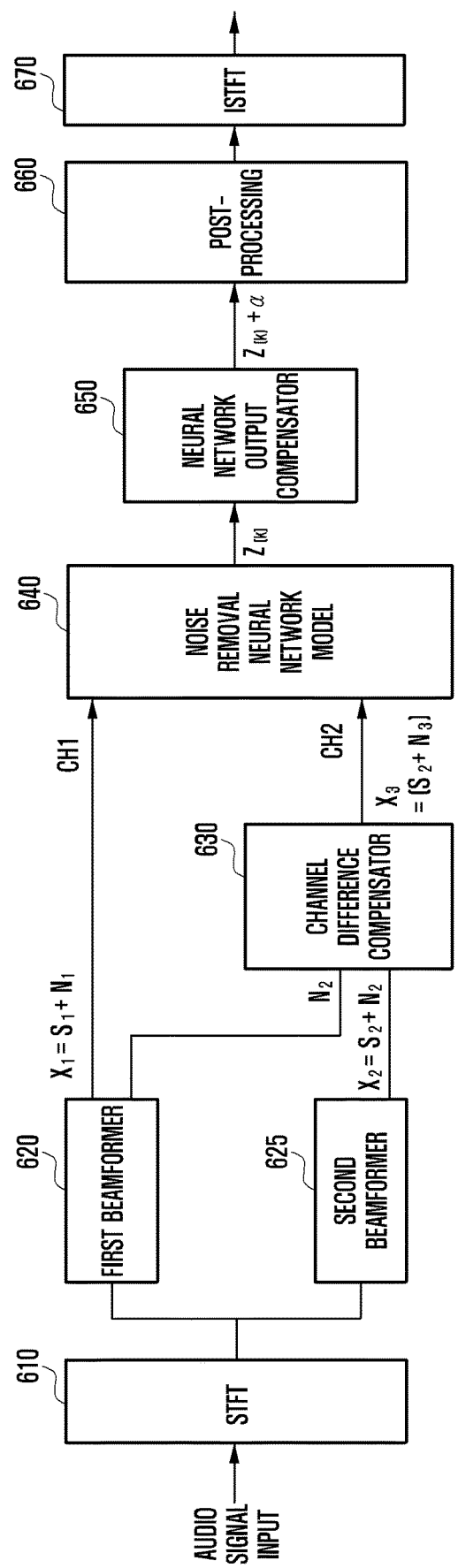
FIG. 6 is a block diagram of a second electronic device according to an embodiment.
Figure 7:
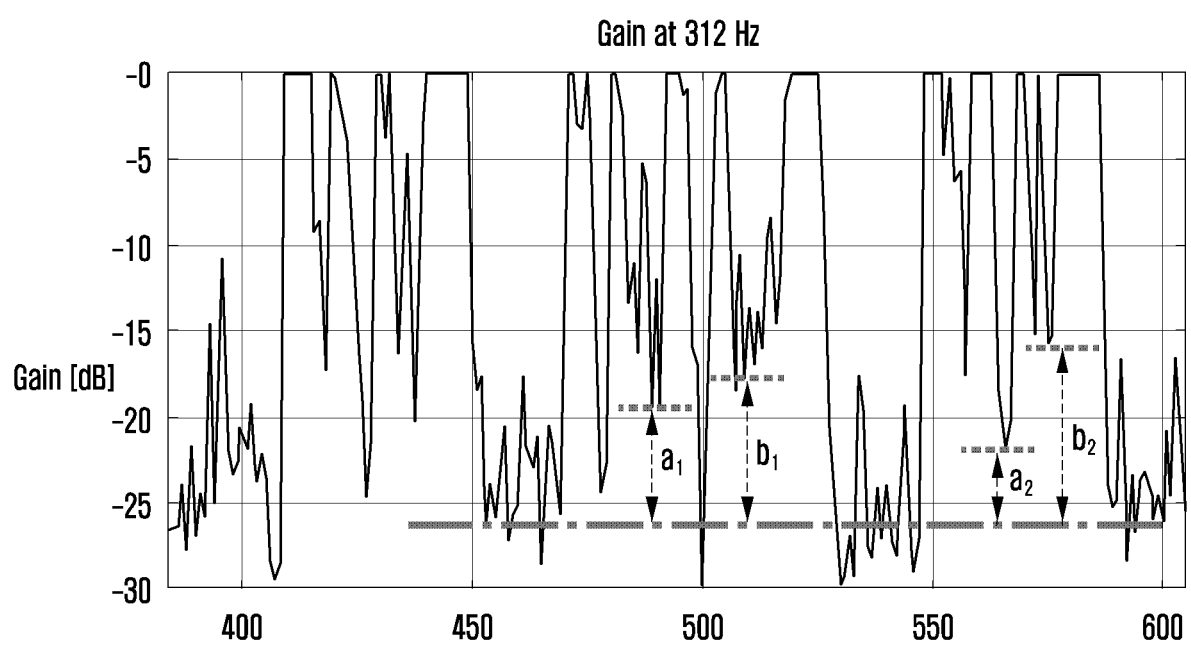
FIG. 7 illustrates a change of noise amount according to an embodiment.

FIG. 6 is a block diagram of a second electronic device according to an embodiment, and FIG. 7 illustrates a change of noise amount according to an embodiment.

The block illustrated in FIG. 6 represents a program module, and the program module may be stored in a memory 317 of the second electronic device 301 in FIG. 3 or executed by a processor 315. The block diagram of FIG. 6 is divided into blocks for convenience of description, but program modules of the disclosed embodiments are not limited to the particular implementation shown. The second electronic device 301 illustrated in FIG. 6 may be an electronic device (e.g., a portable electronic device, or a smart device) that receives an audio signal through at least two or more microphones and attenuates (or removes) a noise signal from the received audio signal.

Referring to FIG. 6, according to an embodiment, the second electronic device 301 illustrated in FIG. 3 may include an short time Fourier transformer (STFT) 610, a first beamformer 620, a second beamformer 625, a channel difference compensator 630, a noise removal neural network model 640, a neural network output compensator 650, a post-processor 660 and/or an inverse short time Fourier transformer (ISTFT) 670. The noise removal neural network model 640 may be a neural network model updated by the first electronic device 304 illustrated in FIG. 4.

The short time Fourier transformer (STFT) 610 may receive an audio signal. For example, the audio signal may be received from at least one microphone. In another example, the audio signal may be received in multiple channels through the first microphone or the second microphone.

According to an embodiment, the STFT 610 may receive audio signals from the first microphone and the second microphone and output the mixed signals in a time-frequency domain by performing a short time Fourier transform (STFT). The STFT 610 may transmit the output multi-channel signal to the first beamformer and the second beamformer.

According to an embodiment, the first beamformer 620 may output the first channel signal $X_1=S_1+N_1$ by beamforming the output multi-channel signal. For example, the first beamformer 620 may be a speaker steering beamformer. The first beamformer 620 may output a first channel signal $X_1=S_1+N_1$ in which a speaker's voice level is emphasized and noise is attenuated using a difference in arrival time of the voice in the multi-channel signal and a noise attenuation rate. The first channel signal $X_1$ may include the first audio signal $S_1$ and the first noise signal $N_1$.

According to an embodiment, the second beamformer 625 may beamform the output multi-channel signal to output a second channel signal $X_2=S_2+N_2$. For example, the second beamformer 625 may be a null steering beamformer. The second beamformer 625 may output a second channel signal $X_2=S_2+N_2$ in which the speaker's voice is attenuated by using a multi-channel voice arrival time difference and the noise removal rate. The second channel signal $X_2$ may include the second audio signal $S_2$ and the second noise signal $N_2$. For example, the level of the second voice signal $S_2$ may be smaller than the level of the first voice signal $S_1$.

According to an embodiment, the channel difference compensator 630 may calculate a noise level difference between channels on the basis of the first noise signal $N_1$ and the second noise signal $N_2$. The channel difference compensator 630 may estimate the compensation value d on the basis of the difference in noise levels between channels and convert the second channel signal $X_2$ into a third channel signal $X_3$ to which the compensation value is applied. The noise signal $N_3$ of the third channel signal $X_3$ may be a signal in which the noise signal $N_2$ of the second channel signal $X_2$ is compensated by a compensation value d.

According to an embodiment, the channel difference compensator 630 may identify a silent section (e.g., a frequency domain without voice) in the first channel signal $X_1$ and the second channel signal $X_2$, calculate a difference in noise levels between channels in the silent section, estimate the average value of the noise level difference, and apply a compensation value corresponding to the average value of the noise level difference.

According to an embodiment, the channel difference compensator 630 may receive frequency information for the silent section and the sound section of the first channel signal $X_1$ and the second channel signal $X_2$ from the post-processor 660, and identify the silent section on the basis of the frequency information.

The noise removal neural network model 640 may receive the first channel signal $X_1$ obtained from the first beamformer 620 and the third channel signal $X_3$ reflecting the compensation value from the channel difference compensator 630 to output a voice signal from which noise is removed or a signal $Z_{(k)}$ (e.g., neural network output signal) in which the SNR of the voice is improved compared to the noise signal using a noise removal gain coefficient. Hereinafter, the voice signal from which noise is removed or the signal with improved SNR of the voice compared to the noise signal $Z_{(k)}$ and the neural network output signal may be substantially the same signal.

The noise removal neural network model 640, for example, may be a noise removal neural network model 470 trained with an input feature that compensates for a difference in noise levels between channels through the channel difference compensator 440 and the training model 460 shown in FIG. 4.

According to an embodiment, the noise removal neural network model 640 may be a noise removal neural network model trained to improve the SNR of the first channel signal $X_1$. In that regard, the first channel signal $X_1$ transmitted from the first beamformer 620 is input to the voice main channel and the third channel signal reflecting the compensation value from the channel difference compensator 440 using $X_3$ is input as a noise reference channel.

The noise removal neural network model 640 may transmit the noise-removed voice signal or the signal with improved SNR of voice compared to noise signal $Z_{(k)}$ to the neural network output compensator 650.

According to an embodiment, the neural network output compensator 650 may identify the sound section of the first channel signal $X_1$ and the sound section of the second channel signal $X_2$. The neural network output compensator 650 may process the signal $Z_{(k)}$ (e.g., neural network output signal) to compare the first channel signal $X_1$ in the sound section with the neural network output signal to estimate an average value for the signal difference, and process the neural network output signal to compensate for voice distortion on the basis of the average value. For example, as illustrated in FIG. 7, the output signal from the neural network may be identified to have a difference in the noise removal amount in the section (a) where only noise is present and the noise removal amounts in the section (b) where a voice is present.

According to an embodiment, the neural network output compensator 650 may process the signal $Z_{(k)}$ (e.g., neural network output signal) to compare the noise removal amount of the sound section and the noise removal amount of the silent section for the second channel signal $X_2$ to estimate the average of the noise removal amount, and process the neural network output signal so that the noise removal amount is uniform.

According to an embodiment, the neural network output compensator 650 may process the signal $Z_{(k)}$ (e.g., neural network output signal) to compensate the second channel signal $X_2$ to reduce the noise removal amount in the silent section in which only noise is present by the noise removal amount in the sound section in which a voice is present, and process the noise removal amount to be uniform. The neural network output compensator 650 may estimate the noise removal amount from the frequency components in the silent section and estimate the noise removal amount in the sound section.

According to an embodiment, the post-processor 660 may remove residual noise for the signal $Z_{(k)+\alpha}$ in which the neural network output is compensated. The post-processor 660 may compare the signal $Z_{(k)+\alpha}$ in which the neural network output is compensated with the output signal (e.g., the second channel signal $X_2$) of the second beamformer and use the SNR difference information for the two signals to reduce residual noise. The post-processor 660 may output a signal with the residual noise removed to the ISTFT.

According to an embodiment, the post-processor 660 may determine a sound section and a silent section on the basis of the frequency component, and transmit frequency information for the sound section and the silent section to the channel difference compensator 630 or the neural network output compensator 650.

According to an embodiment, the inverse short time Fourier transformer (ISTFT) 670 may receive a signal from which residual noise has been removed, and perform an inverse short time Fourier transform (ISTFT) to restore and output a time domain sound source signal.

Figure 8:
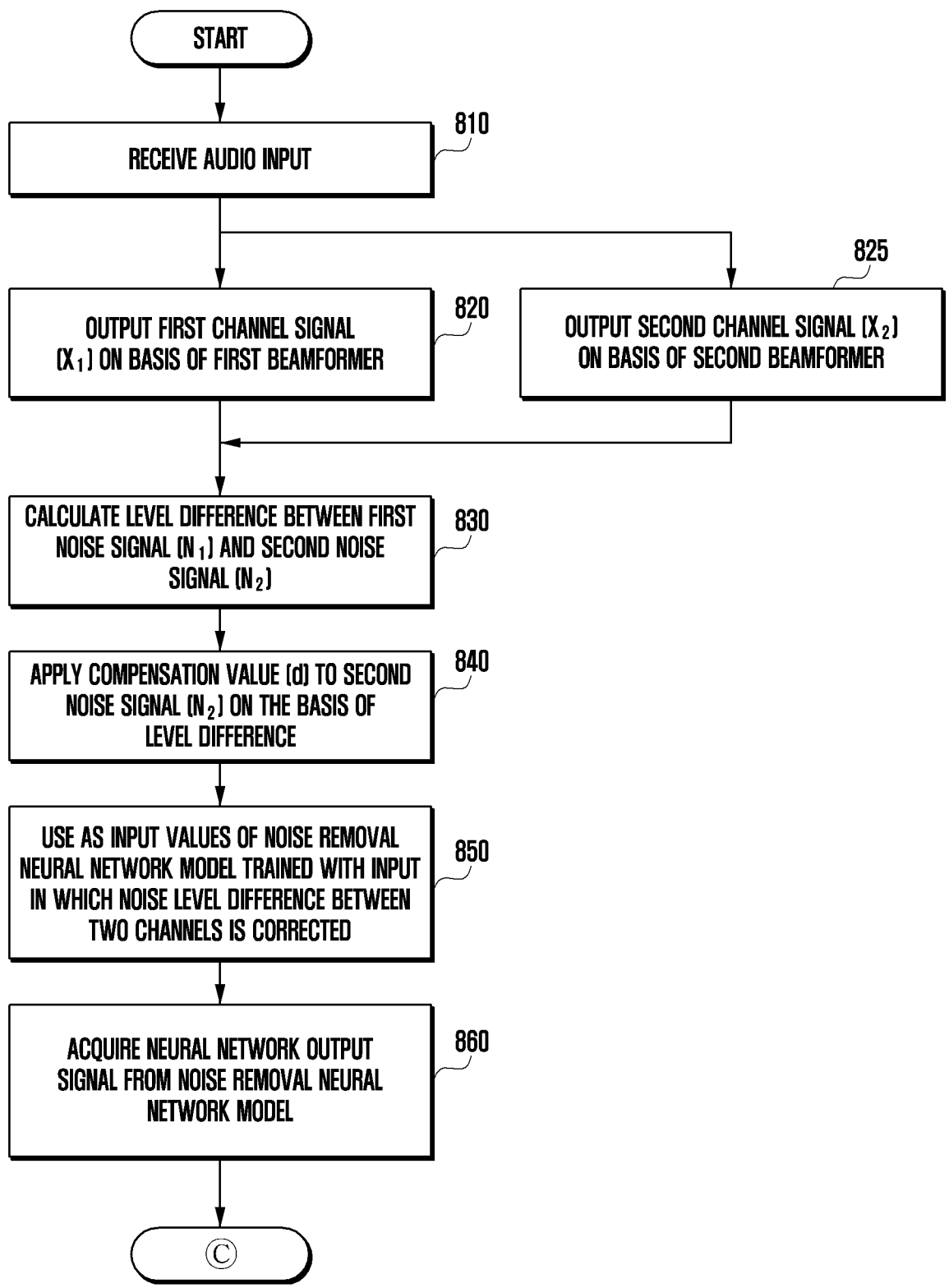
FIG. 8 is a flowchart illustrating a method of removing noise in a second electronic device according to an embodiment.
Figure 9:
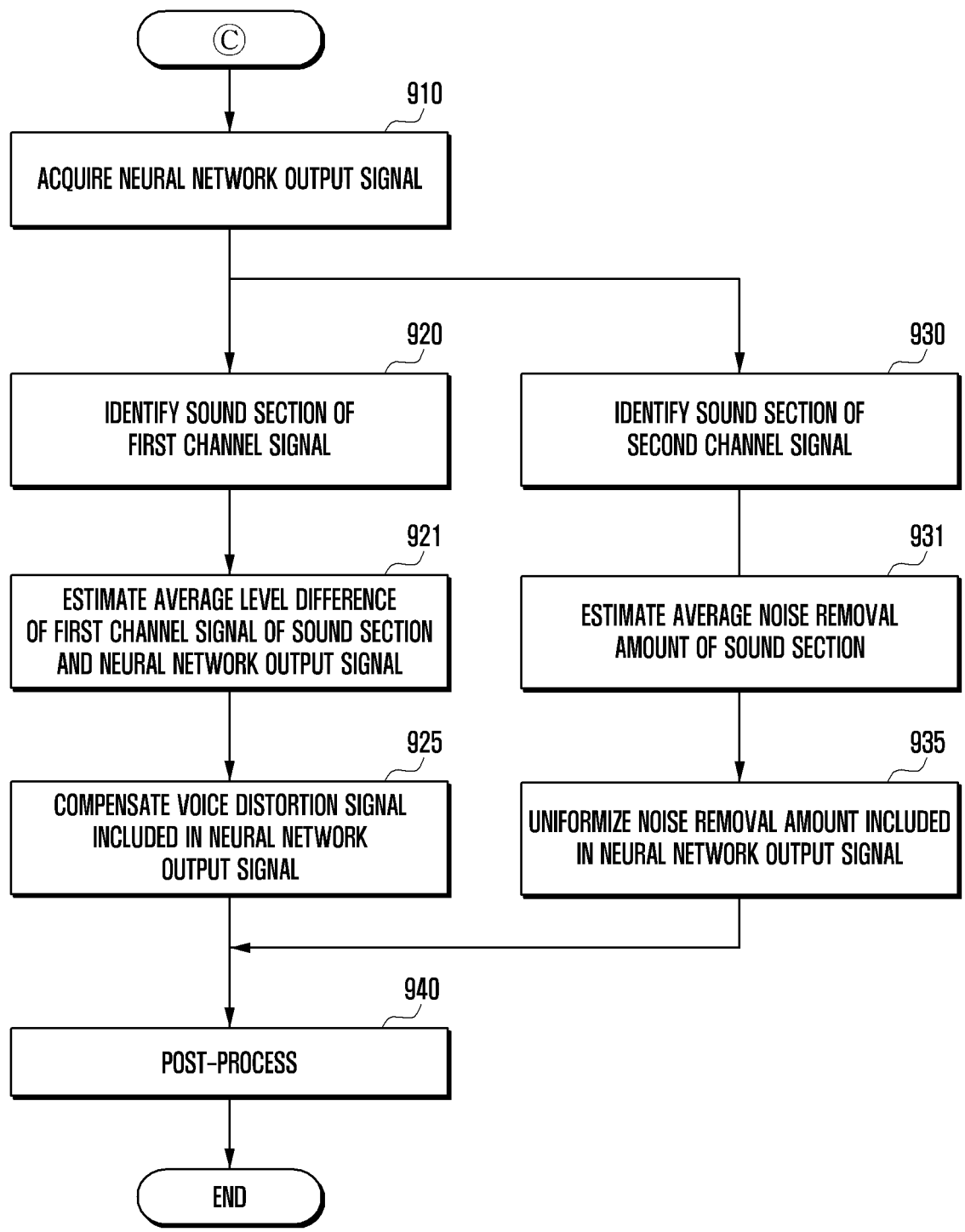
FIG. 9 is another flowchart illustrating a method of removing noise in a second electronic device according to an embodiment.

FIGS. 8-9 illustrate a method of removing noise in a second electronic device according to an embodiment. FIGS. 8-9 collectively is an operation flowchart of the second electronic device 301 shown in FIG. 6. According to an embodiment, the operation of FIG. 8 may represent a method of compensating a neural network input for noise removal, and the operation of FIG. 9 may represent a method of compensating a neural network output for noise removal.

Referring to FIGS. 8 and 9, according to an embodiment, in operation 810, a processor 315 of the second electronic device 301 may receive an audio input from microphones 311. For example, the audio signal may be a multi-channel audio signal input through at least two microphones 311.

In operation 820, the processor 315 may output a first channel signal on the basis of a first beamformer 620 for the multi-channel audio signal. The first channel signal may be a first channel signal $X_1=S_1+N_1$ in which the speaker's voice is emphasized and noise is attenuated by using a difference in arrival times of multi-channel voices and a noise removal rate. The first channel signal $X_1=S_1+N_1$ may include the first audio signal $S_1$ and the first noise signal $N_1$.

In operation 825, the processor 315 may output a second channel signal on the basis of the second beamformer 625 for the multi-channel voice signal. The second channel signal may be a second channel signal $X_2=S_2+N_2$ in which the speaker's voice is attenuated by using a multi-channel voice arrival time difference and a noise removal rate. The second channel signal $X_2=S_2+N_2$ may include the second audio signal $S_2$ and the second noise signal $N_2$. Operations 820 and 825 may be performed sequentially or in parallel.

In operation 830, the processor 315 may calculate a level difference between the noise signal $N_1$ of the first channel signal $X_1$ and the noise signal $N_2$ of the second channel signal $X_2$. For example, the processor 315 may calculate or estimate the noise level difference by comparing the difference in output levels between the silent section of the first channel signal $X_1$ and the silent section of the second channel signal $X_2$.

In operation 840, the processor 315 may estimate the compensation value according to the level difference between the first noise signal $N_1$ and the second noise signal $N_2$ and apply the compensation value to the second noise signal $N_2$. For example, the compensation value may refer to a value for frequency compensation, and the processor 315 may perform frequency compensation on the second channel signal $X_2$. The processor 315 may convert the second channel signal $X_2=S_2+N_2$ into a third channel signal $X_3=S_3+N_3$ to which the compensation value d is applied.

In operation 850, the processor 315 may use a third channel signal $X_3=S_3+N_3$ to which the compensation value is applied and the first channel signal $X_1$ as input values of the noise removal neural network model in which the noise signal is trained with an input in which a noise level difference between multi-channels is corrected.

In operation 860, the processor 315 may acquire a neural network output signal from the noise removal neural network model 640. The neural network output signal may include at least one of a signal with an improved signal-to-noise-ratio (SNR) of the voice compared to the noise signal or a voice signal from which noise is removed.

The processor 315 proceeds to operation C, and operation 860 may be substantially the same as operation 910 of FIG. 9.

In operation 920, the processor 315 may identify the sound section of the first channel signal $X_1$.

In operation 930, the processor 315 may identify the sound section of the second channel signal.

In operation 921, the processor 315 may estimate the average value of the signal level difference by comparing the neural network output signal with the first channel signal $X_1$ in the sound section.

In operation 925, the processor 315 may correct the neural network output signal by compensating for voice distortion on the basis of the average value.

In operation 931, the processor 315 may estimate the average of the noise removal amount by comparing the level difference of the noise removal amount in the sound section.

In operation 935, the processor 315 may uniformize the noise removal amount in the silent section and the noise removal amount in the sound section.

In operation 940, the processor 315 may perform post-processing to remove residual noise.

Figure 10:
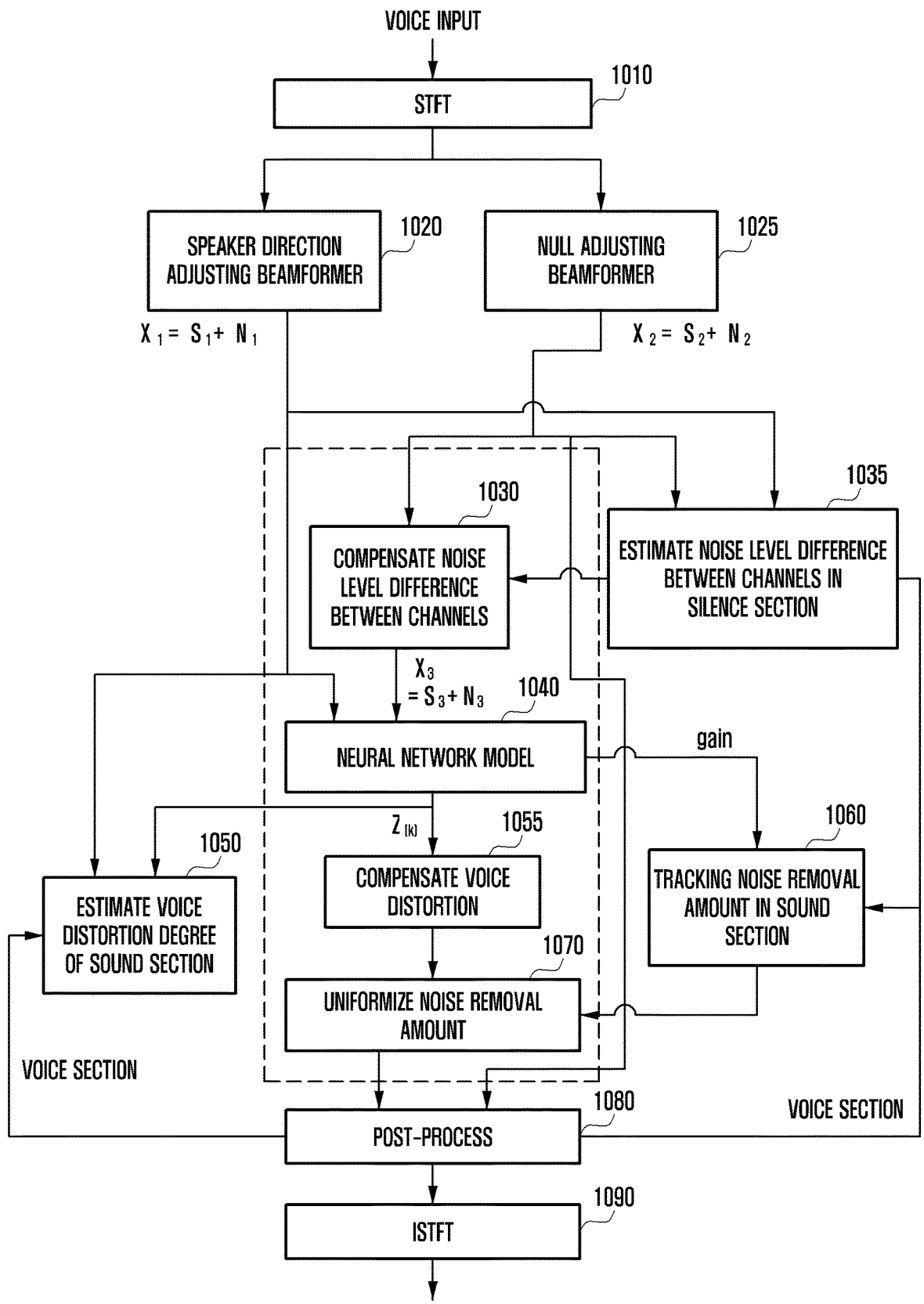
FIG. 10 illustrates a method of removing noise in a second electronic device according to an embodiment.

FIG. 10 illustrates a method of removing noise in a second electronic device according to an embodiment. FIG. 10 is an operation flowchart of the second electronic device 301 shown in FIG. 6.

Referring to FIG. 10, the second electronic device 301 according to an embodiment may receive a multi-channel voice input through at least two microphones 311.

In operation 1010, the processor 315 may output a multi-channel audio input signal by performing a short time Fourier transform (STFT).

In operation 1020, the processor 315 may output a first channel signal $X_1=S_1+N_1$ by beamforming a time-frequency converted multi-channel signal in the direction of the speaker. For example, the first channel signal $X_1$ may be a signal in which a speaker's voice level is emphasized and noise is attenuated. The first channel signal $X_1=S_1+N_1$ may include the first audio signal $S_1$ and the first noise signal $N_1$.

In operation 1025, the processor 315 may output a second channel signal $X_2=S_2+N_2$ by null-beamforming the time-frequency converted multi-channel signal. For example, the second channel signal $X_2$ may be a signal in which the speaker's voice is attenuated. The second channel signal $X_2=S_2+N_2$ may include the second audio signal $S_2$ and the second noise signal $N_2$.

In operation 1030, the processor 315 may identify the silent sections of the first channel signal $X_1$ and the second channel signal $X_2$, and estimate the difference in noise levels between channels in the silent sections.

In operation 1035, the processor 315 may compensate for a difference in noise levels between channels for the second channel signal $X_2$. The processor 315 may estimate the compensation value d on the basis of the difference in noise levels between the two channels, and convert the second channel signal $X_2$ into a third channel signal $X_3=S_3+N_3$ to which the compensation value is applied. The noise signal $N_3$ of the third channel signal $X_3$ may be a signal in which the noise signal $N_2$ of the second channel signal $X_2$ is compensated by a compensation value d.

In operation 1040, the processor 315 may output the neural network output signal $Z_{(k)}$ by inputting the first channel signal $X_1$ and the third channel signal $X_3=S_3+N_3$ to the neural network model. The neural network output signal $Z_{(k)}$ may be a signal in which the SNR of a voice is improved compared to a noise signal or a voice signal from which noise is removed.

In operation 1050, the processor 315 may compare the first channel signal $X_1$ and the neural network output signal $Z_{(k)}$ to estimate distortion information of a voice in the sound section.

In operation 1055, the processor 315 may compensate for the voice distorted signal by comparing the third channel signal $X_3$ of the sound section with the neural network output signal.

In operation 1060, the processor 315 may estimate the noise removal amount in the sound section by tracking the noise removal amount in the frequency component of the silent section.

In operation 1070, the processor 315 may compensate to reduce the noise removal amount in the silent section by the noise removal amount in the sound section, so that the noise removal amount is uniform.

In operation 1080, the processor 315 may post-process the corrected signal so that the amount of voice distortion and noise removal is uniform.

In operation 1090, the processor 315 may perform an inverse short time Fourier transform (ISTFT) to restore a time domain sound source signal and output a voice input signal.

An electronic device (e.g., the second electronic device 301 of FIG. 3) according to an embodiment may include a communication circuit (e.g., the communication circuit 310 of FIG. 3), at least two microphones (e.g., the microphones 311 of FIG. 3), a processor (e.g., the processor 315 of FIG. 3) operatively connected to the communication circuit and the at least two microphones, and a memory (e.g., the memory 317 of FIG. 3) operatively connected to the processor and storing a noise removal neural network model (e.g., the noise removal neural network model 319 of FIG. 3) that uses a first channel signal corresponding to a first beamformer and a second channel signal corresponding to a second beamformer as input values.

The memory 317 may store instructions that, when executed, enable the processor 315 to: acquire the first channel signal using the first beamformer and the second channel signal using the second beamformer for the audio input signal input through the at least two microphones; generate a third channel signal in which a difference in noise levels between the first channel signal and the second channel signal is compensated; and output a neural network output signal using the first channel signal and the third channel signal as input values for the noise removal neural network model.

According to an embodiment, the memory 317 may further store instructions that, when executed, enable the processor 315 to: identify sound sections and silent sections from the first channel signal and the second channel signal; and compare a difference in output levels between the silent section of the first channel signal and the silent section of the second channel signal to calculate the difference in noise levels.

According to an embodiment, the memory 317 may further store instructions that, when executed, enable the processor 315 to: estimate an average value of the difference in noise levels; and frequency-compensate the second channel signal with a compensation value corresponding to the average value to generate the third channel signal.

According to an embodiment, the first channel signal may include a signal in which a speaker's voice level is emphasized and noise is attenuated using a difference in arrival times of multi-channel voices and a noise removal rate, and the second channel signal may include a signal in which the speaker's voice level is attenuated.

According to an embodiment, the neural network output signal may include at least one of a signal with improved signal-to-noise-ratio (SNR) of a voice compared to a noise signal or a voice signal from which noise is removed via the noise removal neural network model, and the memory 317 may further store instructions that, when executed, enable the processor 315 to: identify a sound section of the first channel signal; compare the first channel signal in the sound section and the neural network output signal to estimate an average value of a difference in signal level for the sound section; and process the neural network output signal in order to compensate for voice distortion based on the average value of the difference in signal level in the sound section.

According to an embodiment, the memory 317 may further store instructions that, when executed, enable the processor 315 to: identify a sound section and a silent section of the second channel signal; estimate a noise removal amount from frequency components of the silent section of the second channel signal; and estimate the noise removal amount of the sound section of the second channel signal.

According to an embodiment, the memory 317 may further store instructions that, when executed, enable the processor 315 to compensate the noise removal amount in the silent section of the second channel signal to be reduced by the noise removal amount in the sound section of the second channel signal, and process the neural network output signal according to the compensated noise removal amount in the silent section of the second channel signal so that a noise removal amount of the neural network output signal is uniform.

According to an embodiment, the memory 317 may further store instructions that, when executed, enable the processor 315 to remove or attenuate residual noise in the processed neural network output signal such that the compensated voice distortion and the noise removal amount are uniform.

According to an embodiment, the memory 317 may further store instructions that, when executed, enable the processor 315 to: transmit the audio input signal input through the at least two microphones 311 to a first beamformer and a second beamformer by performing short time Fourier transform (STFT); and perform inverse short time Fourier transform (ISTFT) on the neural network output signal whose residual noise is removed or attenuated to restore the sound source signal.

According to an embodiment, the noise removal neural network model 319 may be a neural network model based on at least one of a convolutional neural network (CNN), a recurrent neural network (RNN), or a deep neural network (DNN).

Figure 11:
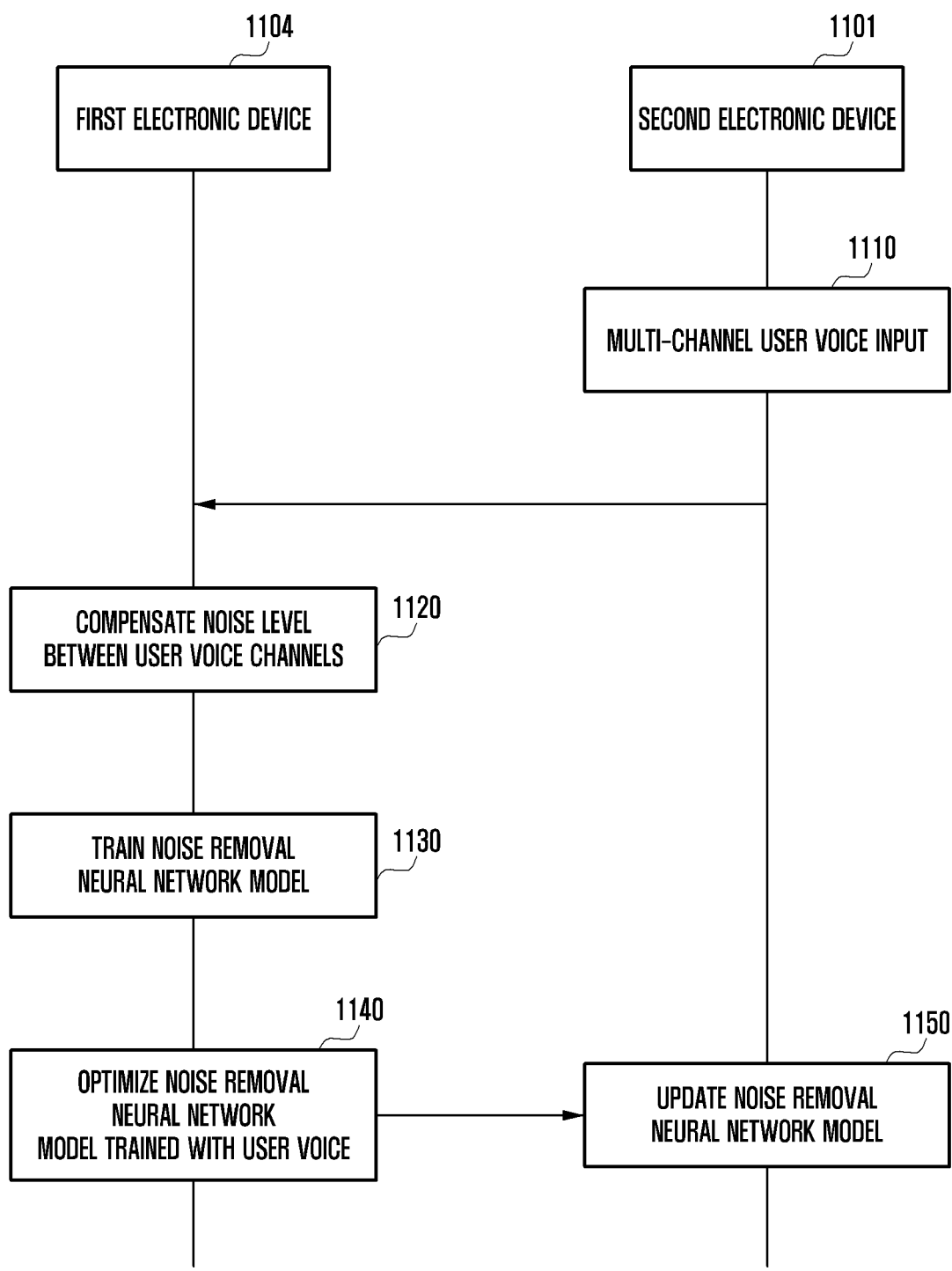
FIG. 11 is a flowchart illustrating an operation of an electronic device and a second electronic device according to an embodiment.

FIG. 11 is a flowchart illustrating an operation of an electronic device and a second electronic device according to an embodiment.

Referring to FIG. 11, according to an embodiment, the first electronic device 1104 and the second electronic device 1101 may update the noise removal neural network model in real time or periodically. For example, the first electronic device 1104 (e.g., the first electronic device 304 of FIG. 4) may be a device (e.g., a server) that implements and trains a noise removal neural network model, and the second electronic device 1101 (e.g., the second electronic device 301 of FIG. 6) may be a portable electronic device or a smart phone.

In operation 1110, the second electronic device 1101 may detect a multi-channel user voice input. The second electronic device 1101 may activate a voice recognition function in response to a user request or a specific function execution, and receive a user voice signal input through at least two microphones. The user voice signal may be received via multiple channels through a first microphone and a second microphone.

The second electronic device 1101 may generate a first channel signal in which the user's voice level is emphasized and noise is attenuated using the first beamformer. The second electronic device 1101 may generate a second channel signal in which the user's voice is attenuated using the second beamformer.

The second electronic device 1101 may transmit the first channel signal and the second channel signal to the first electronic device 1104. For example, the second electronic device 1101 may transmit multi-channel signals from the microphone to the first electronic device 1104 whenever the voice recognition function is executed.

In operation 1120, the first electronic device 1104 may compensate the noise level between the user voice channels for the first channel signal and the second channel signal transmitted from the second electronic device. For example, the first electronic device 1104 may identify a silent section (e.g., a frequency domain without voice) in the first channel signal and the second channel signal, calculate a noise level difference between channels in the silent section, and estimate a compensation value on the basis of the difference in noise level between channels. The first electronic device 1104 may generate a third channel signal in which the compensation value is applied to the second channel signal.

In operation 1130, the first electronic device 1104 may train the noise removal neural network model on the basis of the third channel signal for which the noise signal is compensated and the first channel signal.

In operation 1140, the first electronic device 1104 may optimize the noise removal neural network model trained with the user's voice according to the training result. The first electronic device 1104 may transmit update information of the optimized noise removal neural network model, or the optimized noise removal neural network model to the second electronic device 1101 according to the user's voice.

In operation 1150, the second electronic device 1101 may update the noise removal neural network model stored in the second electronic device 1101.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
a communication circuit;
at least two microphones;
a processor configured to be operatively connected to the communication circuit and the at least two microphones; and
a memory configured to be operatively connected to the processor and store a noise removal neural network model using a first channel signal corresponding to a first beamformer and a second channel signal corresponding to a second beamformer as an input value,
wherein the memory stores instructions that, when executed, enable the processor to:
acquire the first channel signal using the first beamformer and the second channel signal using the second beamformer for an audio input signal input through the at least two microphones;
generate a third channel signal in which a difference in noise levels between the first channel signal and the second channel signal is compensated; and
output a neural network output signal by using the first channel signal and the third channel signal as input values for the noise removal neural network model.

2. The electronic device of claim 1, wherein the memory further stores instructions that, when executed, enable the processor to:
identify sound sections and silent sections from the first channel signal and the second channel signal; and
compare a difference in output levels between the silent section of the first channel signal and the silent section of the second channel signal to calculate the difference in noise levels.

3. The electronic device of claim 2, wherein the memory further stores instructions that, when executed, enable the processor to:
estimate an average value of the difference in noise levels; and
frequency-compensate the second channel signal with a compensation value corresponding to the average value to generate the third channel signal.

4. The electronic device of claim 1, wherein the first channel signal includes a signal in which a speaker's voice level is emphasized and noise is attenuated using a difference in arrival times of multi-channel voices and a noise removal rate, and the second channel signal includes a signal in which the speaker's voice level is attenuated.

5. The electronic device of claim 1, wherein the neural network output signal includes a signal with an improved signal-to-noise-ratio (SNR) of a voice compared to a noise signal or a voice signal from which noise is removed via the noise removal neural network model,
wherein the memory further stores instructions that, when executed, enable the processor to:
identify a sound section of the first channel signal,
compare the first channel signal in the sound section and the neural network output signal to estimate an average value of a difference in signal level for the sound section; and
process the neural network output signal in order to compensate for voice distortion based on the average value of the difference in signal level in the sound section.

6. The electronic device of claim 5, wherein the memory further stores instructions that, when executed, enable the processor to:
identify a sound section and a silent section of the second channel signal,
estimate a noise removal amount from frequency components of the silent section of the second channel signal; and
estimate a noise removal amount of the sound section of the second channel signal.

7. The electronic device of claim 6, wherein the memory further stores instructions that, when executed, enable the processor to:
compensate the noise removal amount in the silent section of the second channel signal to be reduced by the noise removal amount in the sound section of the second channel signal; and
process the neural network output signal according to the compensated noise removal amount in the silent section of the second channel signal so that a noise removal amount of the neural network output signal is uniform.

8. The electronic device of claim 7, wherein the memory further stores instructions that, when executed, enable the processor to remove or attenuate residual noise in the processed neural network output signal such that the compensated voice distortion and noise removal amount are uniform.

9. The electronic device of claim 1, wherein the memory further stores instructions that, when executed, enable the processor to:
transmit the audio input signal input through the at least two microphones to the first beamformer and the second beamformer by performing short time Fourier transform (STFT); and
perform inverse short time Fourier transform (ISTFT) on the neural network output signal whose residual noise is removed or attenuated to restore to a sound source signal.

10. The electronic device of claim 1, wherein the noise removal neural network model is a neural network model based on a convolutional neural network (CNN), a recurrent neural network (RNN), and/or a deep neural network (DNN).

11. An electronic device comprising:
a memory configured to store a noise removal neural network model and data utilized in the noise removal neural network model; and
a processor configured to be electrically connected to the memory,
wherein the memory stores instructions that, when executed, enable the processor to:
output a first channel signal using a first beamformer for a multi-channel voice signal;
output a second channel signal using a second beamformer;
generate a third channel signal in which a difference in noise levels between the first channel signal and the second channel signal is compensated; and
train the noise removal neural network model by using the third channel signal in which the difference in noise levels is compensated and the first channel signal as input values.

12. The electronic device of claim 11, wherein the memory stores instructions that, when executed, enable the processor to:
receive the multi-channel voice signal to build the noise removal neural network model that outputs a noise-removed voice signal or a signal with improved signal-to-noise-ratio (SNR) compared to a noise signal; and train the noise removal neural network model to update a noise removal rule, a noise removal function, and/or a noise removal gain coefficient of the noise removal neural network model.

13. The electronic device of claim 12, further comprising a communication circuit,
wherein the memory stores instructions that, when executed, enable the processor to transmit the noise removal neural network model, the updated noise removal neural network model, and update information of the noise removal neural network model to an external electronic device through the communication circuit.

14. The electronic device of claim 11, wherein the first channel signal includes a signal in which a speaker's voice level is emphasized and noise is attenuated using a difference in arrival times of the multi-channel voice signal and a noise removal rate, and
the second channel signal includes a signal in which the speaker's voice level is attenuated.

15. The electronic device of claim 11, wherein the memory stores instructions that, when executed, enable the processor to:
identify sound sections and silent sections from the first channel signal and the second channel signal; and
compare a difference in output levels between the silent section of the first channel signal and the silent section of the second channel signal to calculate the difference in noise levels.

16. The electronic device of claim 15, wherein the memory stores instructions that, when executed, enable the processor to:
estimate an average value of an output level difference between the silent section of the first channel signal and the silent section of the second channel signal; and
frequency-compensate a noise signal of the second channel signal with a compensation value corresponding to the average value to generate the third channel signal.

17. The electronic device of claim 12, wherein the memory stores instructions that, when executed, enable the processor to:
extract a feature vector based on the third channel signal and the first channel signal; and
input the feature vector as an input value for training the noise removal neural network model,
wherein the feature vector includes a first feature value input to a voice main channel, a second feature value input to a noise reference channel, and a third feature value in which a signal-to-noise ratio (SNR) is improved from the first feature value.

18. The electronic device of claim 17, wherein the memory stores instructions that, when executed, enable the processor to:
designate the first feature value and the second feature value as input variables;
designate the third feature value as an output variable; and
train the noise removal neural network model to derive a noise removal rule, a noise removal function, and/or noise removal gain coefficients based on training data.

19. An electronic device comprising:
a communication circuit;
a memory configured to store a noise removal neural network model and data utilized in the noise removal neural network model; and
a processor configured to be electrically connected to the memory,
wherein the memory stores instructions that, when executed, enable the processor to:
receive a first channel user voice signal and a second channel user voice signal from an external electronic device through the communication circuit;
generate a third channel user voice signal in which a difference in noise levels between the first channel user voice signal and the second channel user voice signal is compensated; and
train the noise removal neural network model using the third channel user voice signal in which the difference in noise levels is compensated and the first channel user voice signal as input values to optimize the noise removal neural network model for user voice.

20. The electronic device of claim 19, wherein the first channel user voice signal includes a signal in which a user's voice level is emphasized and noise is attenuated, and the second channel user voice signal includes a signal in which the user's voice is attenuated, and
wherein the memory stores instructions that, when executed, enable the processor to transmit the noise removal neural network model optimized for user voice and/or update information of the noise removal neural network model to an external electronic device through the communication circuit.

* * * * *